(12) United States Patent
Bawks

(10) Patent No.: US 8,051,744 B2
(45) Date of Patent: Nov. 8, 2011

(54) LOCKING DIFFERENTIAL

(75) Inventor: James Robert Bawks, Harrison Township, MI (US)

(73) Assignee: Eaton Corporation, Southfield, MI (US)

( * ) Notice: Subject to any disclaimer, the term of this patent is extended or adjusted under 35 U.S.C. 154(b) by 465 days.

(21) Appl. No.: 12/397,446

(22) Filed: Mar. 4, 2009

(65) Prior Publication Data
US 2010/0227728 A1 Sep. 9, 2010

(51) Int. Cl.
*F16H 48/12* (2006.01)
(52) U.S. Cl. .......................................... 74/650
(58) Field of Classification Search .............. 74/650
See application file for complete search history.

(56) References Cited

U.S. PATENT DOCUMENTS

| | | | | |
|---|---|---|---|---|
| 2,329,059 A | 9/1943 | Knoblock | ...................... | 74/389.5 |
| 2,638,794 A | 5/1953 | Knoblock | ...................... | 74/650 |
| 3,397,593 A * | 8/1968 | Knoblock | ...................... | 74/650 |
| 3,791,238 A | 2/1974 | Bokovoy | ...................... | 74/650 |
| 4,424,725 A | 1/1984 | Bawks | ...................... | 74/650 |
| 4,745,818 A | 5/1988 | Edwards et al. | ................ | 74/650 |
| 6,076,429 A * | 6/2000 | Valente | ........................... | 74/650 |
| 6,688,194 B2 | 2/2004 | Dissett et al. | ................... | 74/650 |

* cited by examiner

*Primary Examiner* — Dirk Wright
(74) *Attorney, Agent, or Firm* — Bliss McGlynn, P.C.

(57) ABSTRACT

A locking differential mechanism for supplying torque from a driveshaft to a pair of aligned output shafts including a pair of side gears, a central driver, and a pair of clutch members operatively coupled for rotation with the corresponding one of the pair of side gears. A cam assembly includes a pair of cam members. Each of the pair of cam members includes a plurality of camming teeth extending toward the corresponding teeth on the opposed cam member. Each of the cam members is movable from a first position where the cam teeth are disposed in meshing relationship with respect to each other when the pair of side gears are rotating at substantially the same speed and a second position spaced axially from the first position along the associated side gear so as to move an associated clutch member from its first position to its second position out of driven relationship with the central driver in response to a difference in rotational speed of the associated pair of side gears.

20 Claims, 7 Drawing Sheets

LOCKING DIFFERENTIAL

BACKGROUND OF THE INVENTION

1. Field of the Invention

The present invention is directed toward differentials, generally, and more specifically, toward locking differentials that operatively couple a pair of axle half shafts during most driving conditions and that automatically disengage one half shaft in response to predetermined speed differentials between the axles.

2. Description of the Related Art

A differential is a component of an axle assembly and is used to couple a pair of rotating half shafts which make up a portion of the axle assembly. The differential is driven by the driveshaft via a pinion gear that meshes with a ring gear mounted to the differential. In automotive applications, the differential allows the tires mounted at either end of an axle assembly to rotate at different speeds. This becomes important, for example, when the vehicle is turning. The outer tire travels over an arc of greater distance than the inner tire. Thus, the outer tire must rotate at faster speeds than the inner tire to compensate for the greater distance travelled.

There are a number of differential mechanisms that are known in the related art for use in distributing torque between the output shafts. One such differential functions to lock the axle half shafts together during most driving conditions, while disengaging the axles during predetermined conditions, such as in response to differences in axle speed when, for example, the vehicle is turning. These devices are commonly known as "locking differentials."

Many locking differentials include a housing that supports a pair of side gears. The side gears are splined for rotation with a pair of axle half shafts. A central driver or spider is mounted for rotation with the differential housing and drives a pair of clutch members disposed on each side of the central driver. A cam member is operatively coupled for rotation with the central driver and also includes camming teeth in meshing relationship with a portion of the driven teeth of each of the clutch members. During most driving conditions, the central driver, clutches and side gears are operatively coupled together so that the axle half shafts rotate together. In the event of a predetermined desired difference in speed between the axle half shafts, such as when the vehicle is turning, portions of the teeth on the clutch associated with the faster turning axle, ride up the cam teeth such that the clutch is moved out of engagement with the central driver. This allows the associated axle half shaft to rotate at a different speed than the other axle half shaft that is still driven by the central driver. Once the speed differential is eliminated, the clutch member is moved back to its original position allowing the drive teeth to be meshingly engaged with the driven teeth on the associated clutch member.

While locking differentials of this type have generally worked for their intended purposes, certain disadvantages remain. For example, locking differentials of the type commonly known in the art are relatively mechanically complex and this complexity adds to the cost of manufacturing the devices. In addition, the interaction between the cam teeth and a portion of the driven teeth on the clutch is less than ideal because the driven teeth function to transmit torque from the central driver as well as respond to speed differentials to ride up the surfaces of the cam teeth. The drive teeth on the central driver and the driven teeth on the clutches are usually designed to cause the teeth to remain in meshing engagement. The interaction between the portion of the driven teeth on the clutch member with the cam teeth act against these meshing forces. This results in the creation of noise and vibration during conditions when there is a speed differential between the axle half shafts.

Thus, there remains a need in the art for a locking differential that has a reduced number of components, is mechanically efficient, may be manufactured at a reduced cost, and that, at the same time, reduces the noise and vibration generated when there is a speed differential between the axle half shafts.

SUMMARY OF THE INVENTION

The present invention overcomes the disadvantages in the related art in a locking differential mechanism for supplying torque from a driveshaft to a pair of aligned output shafts. The locking differential mechanism includes a pair of side gears mounted for rotation with the corresponding pair of aligned output shafts about a common axis. A central driver is operatively coupled to the driveshaft and has a pair of opposed annular faces. Each of the pair of opposed annular faces includes a plurality of drive teeth. A pair of clutch members are operatively coupled for rotation with a corresponding one of the pair of side gears. Each of the pair of clutch members includes a plurality of driven teeth. Each of the pair of clutch members is axially movable between a first position where the driven teeth are adapted for meshing engagement in driven relationship with the drive teeth of the central driver so as to translate torque from the central driver through the clutch members and to the side gears and a second position where the driven teeth are moved out of meshing engagement with the drive teeth on the central driver such that the associated side gear may rotate at a speed different than the central driver. The locking differential mechanism also includes a cam assembly having a pair of opposed cam members. Each of the cam members is mounted for rotation with a corresponding one of the pair of side gears and is disposed in abutting contact with a corresponding one of the pair of clutch members. Each of the pair of opposed cam members includes a plurality of camming teeth extending toward the corresponding teeth on the opposed cam member. Each of the cam members is movable from a first position wherein the camming teeth are disposed in meshing relationship with respect to each other when the pair of side gears are rotating at substantially the same speed and a second position spaced axially from the first position along the associated side gear so as to move an associated clutch member from its first position to its second position. In this way, the camming members move the associated clutch member out of driven relationship with the central driver in response to a variation in rotational speed of the associated one of the pair of side gears.

Because the cam assembly includes a pair of cam members that have teeth specially designed to interact with each other to provide a corresponding camming action thereby moving the clutch members axially away from the central driver, this arrangement results in less internal wear in the locking differential mechanism as well as quieter and smoother operation. The locking differential also has a reduced number of hold out rings when compared to the devices known in the related art. Thus, the present invention is mechanically efficient and may be manufactured at a reduced cost.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
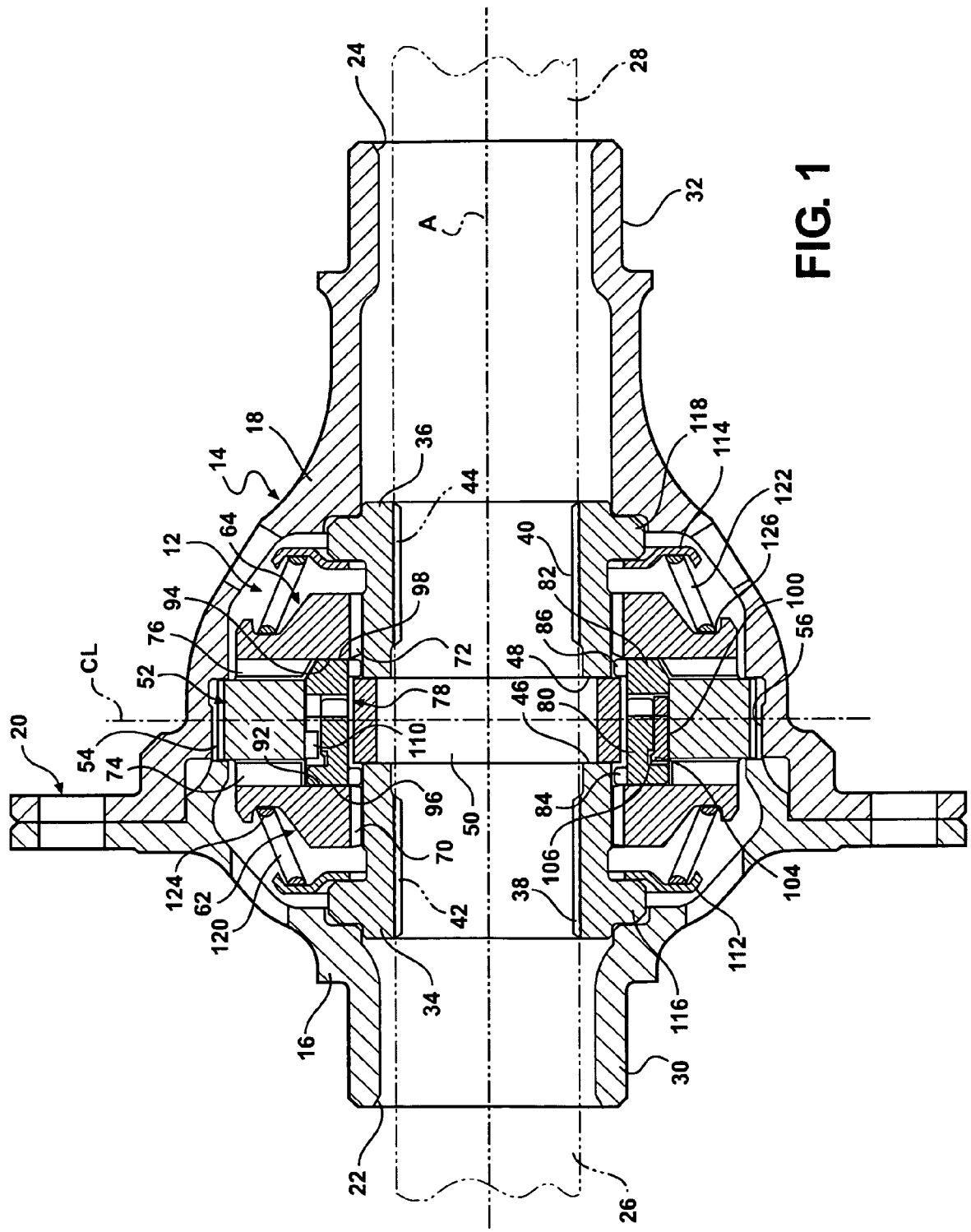
FIG. 1 is a cross-sectional side view of the locking differential of the present invention.

A representative portion of a vehicle drive train for supplying torque from a driveshaft (not shown) to a pair of aligned output shafts (shown in phantom at 26, 28 in FIGS. 1 and 2) is generally illustrated in FIGS. 1-4, where like numerals are used to designate like structure throughout the drawings. Those having ordinary skill in the art will appreciate from the description that follows that the purpose of the figures is to illustrate one example of the invention and are not meant to limit it. The drive train includes a locking differential mechanism, generally indicated at 12 in FIGS. 1 and 2, that is operatively supported in a differential housing, generally indicated at 14 in FIG. 1. The housing 14 may be configured in any suitable way commonly known in the art. For example, in the representative example illustrated in FIG. 1, the housing is defined by two pieces 16, 18 that are operatively mounted together at a flange coupling, generally indicated at 20. A ring gear (not shown) is mounted to the flanged coupling 20 via fasteners such as a nut/bolt arrangement, not shown but commonly known in the art. The housing 14 may also define a pair of openings 22, 24 that are adapted to support a pair of axle half shafts illustrated in phantom in FIGS. 1 and 2 at 26 and 28. To this end, the housing 14 also defines a pair of bearing hubs 30, 32 that the axle half shafts 26, 28 extend therethrough. In most operational environments, a driveshaft has a pinion gear that is disposed in meshing relationship with the ring gear to drive the housing 14 and thus the axle half shafts 26, 28 as will be described in greater detail below.

More specifically, the differential mechanism 12 includes a pair of side gears 34, 36 that are supported for rotation within the housing 14 on bearings as is commonly known in the art. Each of the side gears 34, 36 has a splined inner circumference 38, 40 that cooperates with splines 42, 44 formed on the outer circumference of the axle half shafts 26, 28. In this way, the side gears 34, 36 are fixed to their respective half shafts 26, 28 and the side gears 34, 36 and axle half shafts 26, 28 rotate about a common axis A. Each of the side gears 34, 36 includes an inner terminal end 46, 48. The locking differential mechanism 12 further includes a spacer 50 disposed between the opposed pair of terminal ends 46, 48 of the pair of side gears 34, 36.

The locking differential mechanism also includes a central driver, generally indicated at 52. The central driver 52 includes an outer surface having a plurality of splines 54 that cooperate with splines 56 formed on the inner surface of the housing 14 as shown in FIG. 1 to fix the central driver 52 for rotation with the housing 14. Alternatively, those having ordinary skill in the art will appreciate that a spider may be employed in place of the central driver 52. The spider has the same function as the central driver, except that a spider is operatively connected to the housing 14 typically via four trunions that are inserted into mating holes formed in the housing. Thus, for purposes of the discussion that follows, those having ordinary skill in the art will appreciate that the central driver 52 and spider are interchangeable. As best shown in FIG. 3, the central driver 52 also has a pair of opposed annular faces 58. Each of the pair of opposed annular faces includes a plurality of drive teeth 60. The locking differential mechanism 12 also includes a pair of clutch members, generally indicated at 62, 64, that are operatively coupled for rotation with a corresponding one of a pair of side gears 34, 36. To this end, each of the pair of side gears 34, 36 includes a splined outer circumference 66, 68, respectively (FIG. 3). Each of the pair of clutch members 62, 64 includes a corresponding splined inner circumference 70, 72. Each of the pair of clutch members 62, 64 is supported for rotation via the respective splines with an associated one of the pair of side gears 34, 36, respectively. In addition, each of the pair of clutch members 62, 64 is disposed on opposite sides of the central driver 52. Each of the pair of clutch members 62, 64 also includes a plurality of driven teeth 74, 76. Each of the pair of clutch members 62, 64 is axially movable relative to its associated side gear 34, 36 between a first position (FIGS. 1, 2, 5 and 8) and a second position (FIGS. 6, 7, 9 and 10). In the first position, the driven teeth 74, 76 of the clutch member 62, 64 are adapted for meshing engagement in driven relationship with the drive teeth 60 of the central driver 52. In this way, the central driver 52 acts to translate torque from the housing 14, through the central driver 52 and the clutch members 62, 64 and thus to the side gears 34, 36. In the second position, the clutch members 62, 64 are moved axially along the outer circumference of the side gears 34, 36 such that the driven teeth 74, 76 are moved out of meshing engagement with the drive teeth 60 on the central driver 52. When a clutch member 62 or 64 is disposed in its second position, the associated side gear 34 or 36, respectively, may rotate at a speed different than the central driver 52, as will be described in greater detail below.

Figure 2:
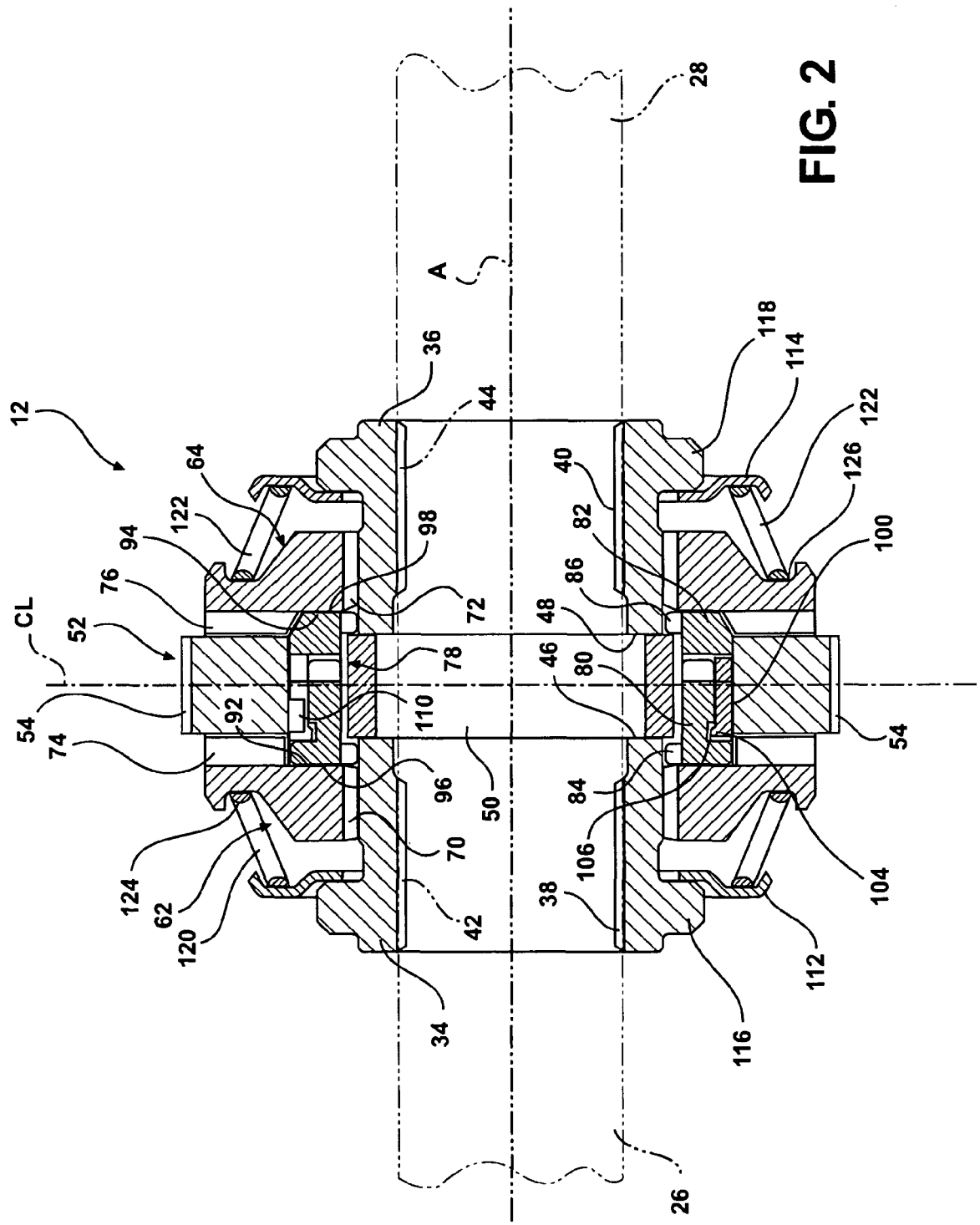
FIG. 2 is a cross-sectional side view of the locking mechanism of the locking differential of the present invention.
Figure 3:
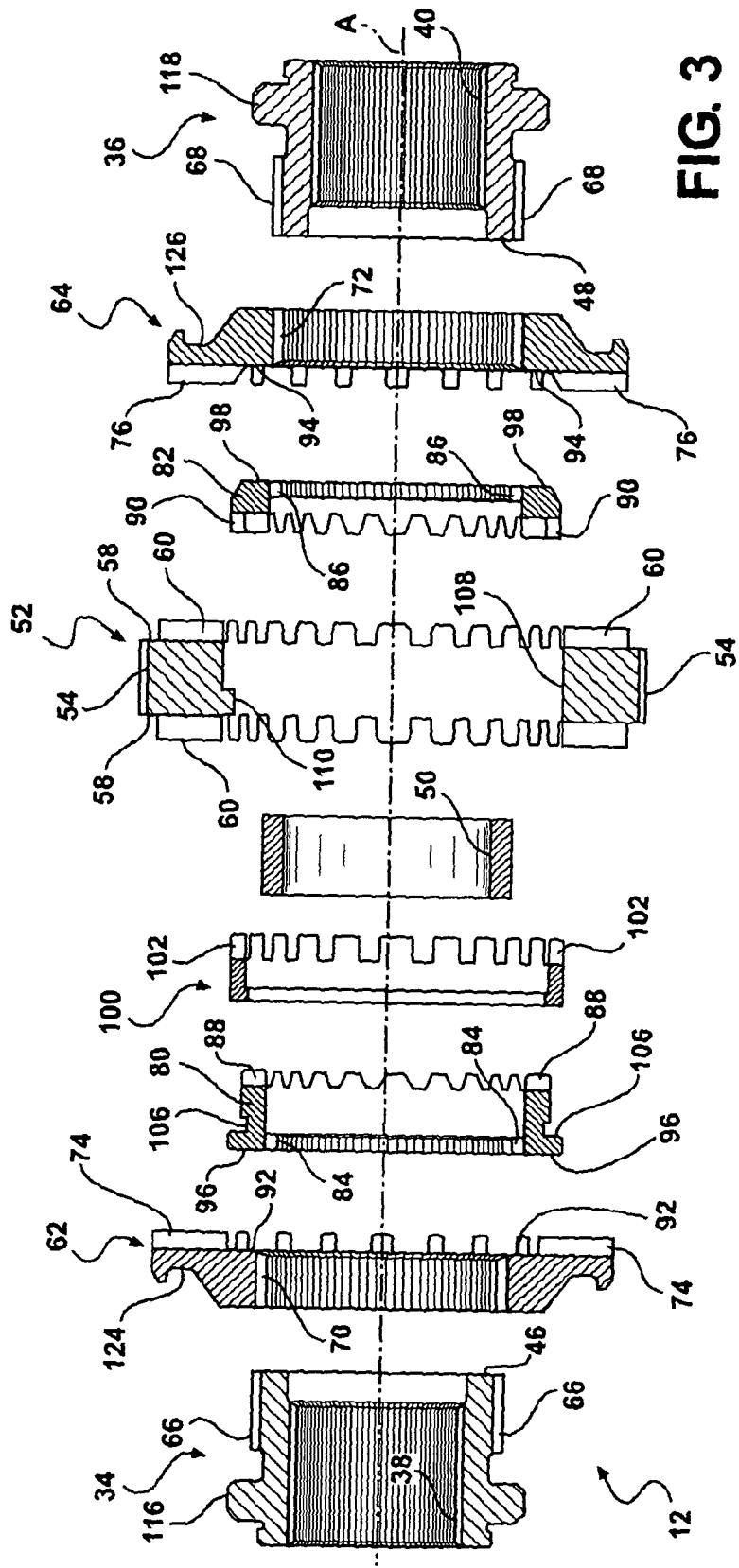
FIG. 3 is an exploded view of the locking mechanism of the locking differential of the present invention.
Figure 4:
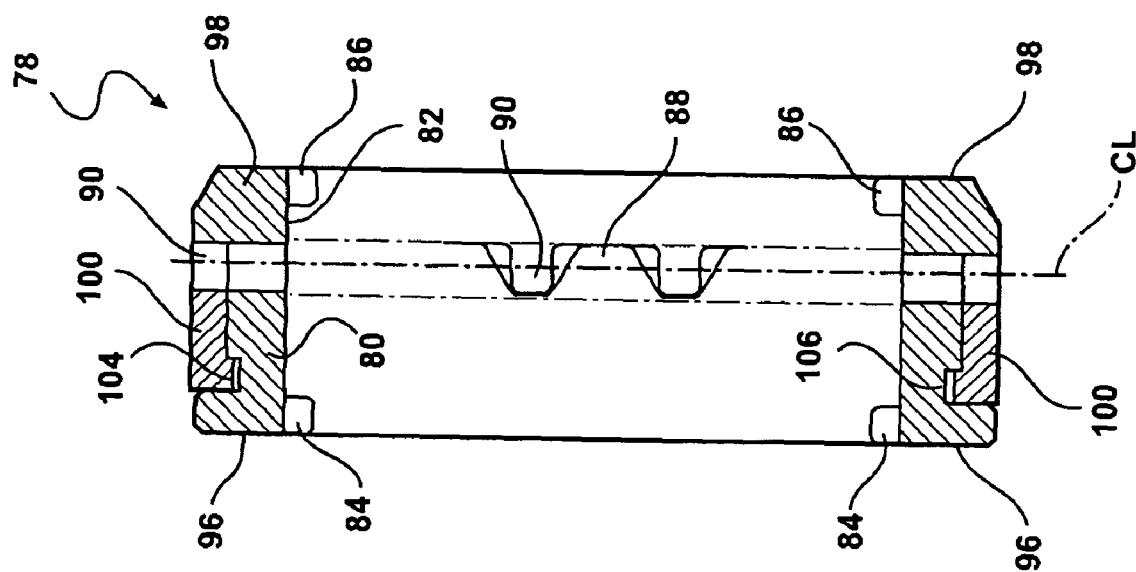
FIG. 4 is a cross-sectional side view of the cam assembly of the present invention.

As best shown in FIGS. 1, 2 and 4, the locking differential mechanism 12 also includes a cam assembly, generally indicated at 78. The cam assembly 78 includes a pair of opposed cam members 80, 82. As best illustrated in FIG. 3, the cam member 80 illustrated to the left of the central driver 52 may be referred to as the "small cam" and the cam member 82 illustrated to the right of the central driver 52 may be referred to as the "large cam." This nomenclature may be employed because the large cam member 82 has a greater radial dimension than the small cam member 80 as will be described in further detail below. Those having ordinary skill in the art will appreciate that the relative location of the large and small cam members 80, 82 with respect to the central driver 52 may be reversed without departing from the scope of the present invention. In any event, each of the cam members 80, 82 is mounted for rotation with a corresponding one of the pair of side gears 34, 36, respectively. Moreover, each of the cam members 80, 82 is disposed in abutting contact with a corresponding one of the pair of clutch members 62, 64. Each of the cam members 80, 82 also include a splined inner circumference 84, 86 which corresponds with and is mating received by the splines 66, 68 on a portion of the outer circumference of the associated side gear 34, 36, respectively.

As best shown in FIG. 3, each of the pair of opposed cam members 80, 82 also includes a plurality of camming 88, 90 teeth extending toward the corresponding teeth on the opposed cam member. Each of the cam members 80, 82 is movable axially along the splines 66, 68 on the outer circumference of its associated side gear 34, 36 between a first position (FIGS. 1, 2, 4, 5 and 8) and a second position (FIGS. 6, 7, 9 and 10). In the first position, illustrated for example in FIGS. 1, 2, 4, 5 and 8, the camming teeth 88, 90 are disposed in meshing relationship with respect to each other when the pair of side gears 34, 36 are rotating at substantially the same speed. When one of the cam members 80, 82 is disposed in its second position illustrated for example in FIGS. 6, 7, 9 and 10, it becomes spaced axially from the first position along the associated side gear 34, 36. In this way, the cam member 80 or 82 also acts to move an associated clutch member 62 or 64 from its first position to its second position thereby moving the clutch member 62, 64 out of driven relationship with the central driver 52 in response to a difference in rotational speed between the associated one of the pair of side gears 34, 36. This occurs, for example, when the vehicle is turning and the outer wheel subscribes an arc of greater radius than the inner wheel.

More specifically, under these circumstances, the camming teeth 88, 90 cause the cam member 80, 82 associated with the side gear 34, 36 rotating at a different speed to move axially relative to the other such that the camming teeth 88, 90 and the associated cam member 80, 82 is moved out of meshing relationship with the opposed cam member. To this end, each of the pair of clutch members 62, 64 defines a smooth annular surface 92, 94 that is disposed radially inward of the plurality of driven teeth 74, 76. The smooth annular surface 92, 94 also faces the direction of the associated cam member 80, 82. On the other hand, each of the cam members 80, 82 includes a correspondingly outwardly directed smooth annular surface 96, 98 disposed in abutting contact with the annular surface 92, 94 on the corresponding one of the clutch members 62, 64. Axial movement of one of the pair of cam members 80, 82 causes similar movement by the associated clutch member 62, 64 via interaction between these mating annular surfaces 92, 94, 96, 98.

The locking differential mechanism 12 also includes a single holdout ring 100 that is mounted for rotation with one of the pair of opposed cam members 80, 82. In the embodiment illustrated herein, the holdout ring 100 is mounted for rotation with the small cam 80. The hold out ring 100 includes a plurality of lugs 102 disposed in annularly spaced positions about the outer circumference of the holdout ring 100. The holdout ring 100 is indexable about the axis of rotation A between a first position and a second position. In the first position, the pair of side gears 34, 36 rotate at the same rotational speed. In the second position, at least one of the cam members 80, 82 is disposed in its second, axially spaced position. In this position, the holdout ring 100 is indexed to its second position and thereby prevents re-engagement of the camming teeth when there is a rotational speed difference between the side gears. More specifically, the lugs 102 act to prevent the re-engagement of the cam members 80, 82 when the holdout ring 100 has been indexed to its second position. As best shown in FIGS. 2 and 3, the large cam 82 has camming teeth 90 of greater radial length than the camming teeth 88 on the small cam 80. When the large cam 82 has moved to its second position, the teeth 90 engage the lugs 102 on the holdout ring 100 and act to index to its second position.

As best shown in FIG. 2, the locking differential mechanism 12 also defines a center line CL that bisects it and extends perpendicularly to the axis of rotation A. As noted above, in the representative example illustrated herein, the holdout ring 100 is mounted about the outer circumference of the small cam member 80 and is biased or located to one side of the center line CL. The holdout ring 100 also includes an inner annular rib 104 that is received in a corresponding groove 106 disposed on the outer circumference of the small cam 80. On the other hand, the central driver 52 defines an inner diameter 108 having a key 110 located biased to one side of the center line CL. The holdout ring 100 includes a slot that is adapted to engage the key 110 when the holdout ring 100 has been indexed to its second position so as to block re-engagement of the camming teeth 88, 90 on the pair of cam members 80, 82. In the representative example illustrated herein, the holdout ring is mounted to the outer circumference of the small cam member 80 so as to be biased to the left of the centerline. Similarly, the key 110 is located on the inner circumference of the central driver at a location biased to the left side of the center line as illustrated in FIGS. 1 and 2. However, those having ordinary skill in the art will appreciate from the description herein that both the holdout ring 100 and the key 110 may be biased to the right of the centerline without departing from the scope of the present invention.

The locking differential mechanism 12 also includes a pair of annular retainers 112, 114 operatively mounted to a corresponding one of the pair of side gears 34, 36, respectively. More specifically, the retainers 112, 114 are mounted against shoulders 116, 118 formed on the side gears 34, 36. A pair of biasing members 120, 122 is disposed between each one of the pair of retainers 112, 114 and one of the pair of clutch members 62, 64. To this end, each of the clutch members 62, 64 includes an annular retaining groove 124, 126 that is adapted to receive and retain one end of the biasing members 120, 122. The pair of biasing members 120, 122 act to bias the pair of clutch members 62, 64 toward the clutch members' first position and into engagement with the central driver 52. In one embodiment, the biasing members 120, 122 may include a pair of coiled springs. However, those having ordinary skill in the art will appreciate that any suitable biasing member may be employed for this purpose.

The key 110 defined on the inner circumference of the central driver 52 has a predetermined axial width. The holdout ring 100 is supported for axial movement with one 80 of the pair of cam members 80, 82. As noted above, in the embodiment illustrated herein, this cam member 80 is the smaller of the two. The second position of the pair of clutch members 62, 64 is limited by the pair of annular retainers. The axial width of the key 110 is designed such that the distance of travel of the pair of clutch members 62, 64 to the second position is less than the axial width of the key. In this way, the holdout ring 100 is prevented from being moved axially out of engagement with the key 110 when the holdout ring 100 is indexed to its second position. This feature prevents the problem where the holdout ring "jumps the key." When the holdout ring jumps the key as can happen with differential mechanisms known in the related art, other components of the differential mechanism can become axially skewed and this results in failure of the components. Thus, the present invention is specifically designed to prevent this problem from occurring.

Figure 5:
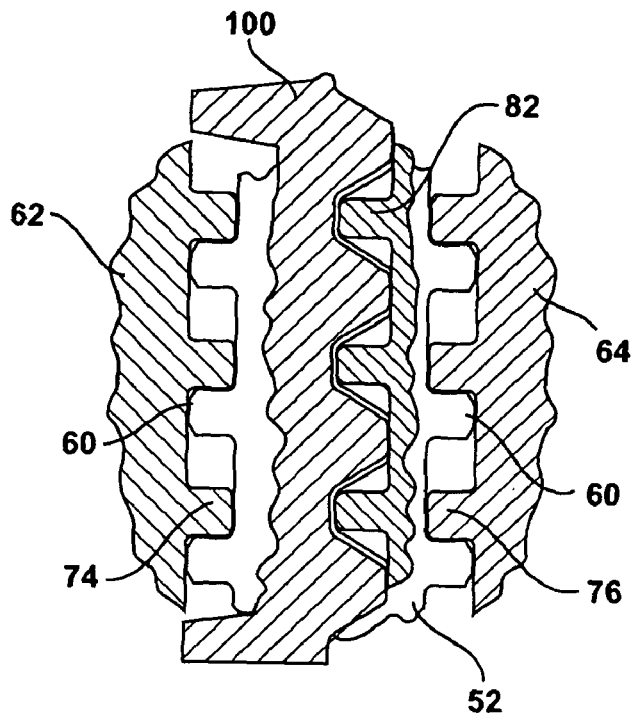
FIG. 5-10 are diagrams illustrating the relative disposition of the components of the cam assembly and the associated clutch members when the axle half shafts are locked together as well as during other driving conditions when there is a speed differential between the axle half shafts.
Figure 6:
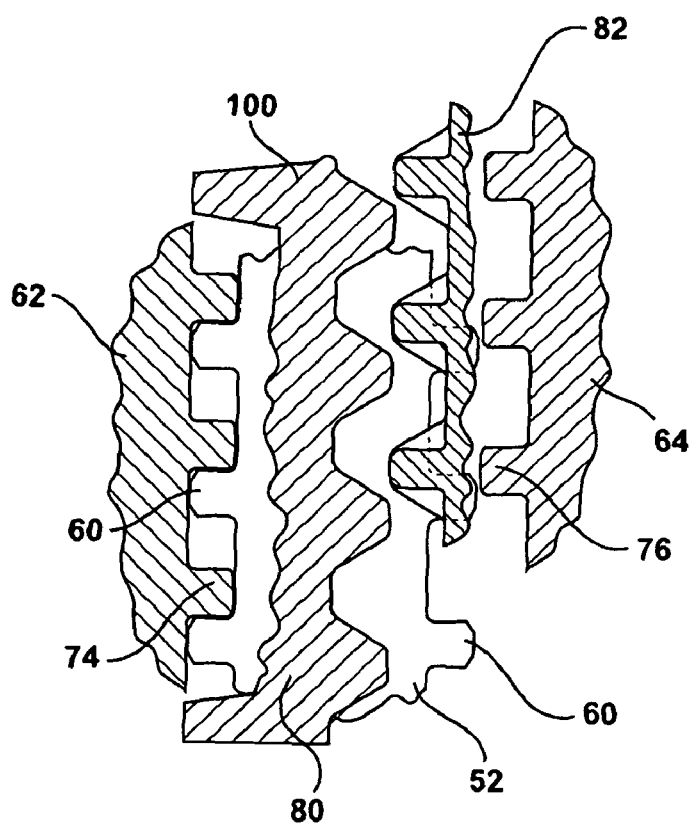
Figure 7:
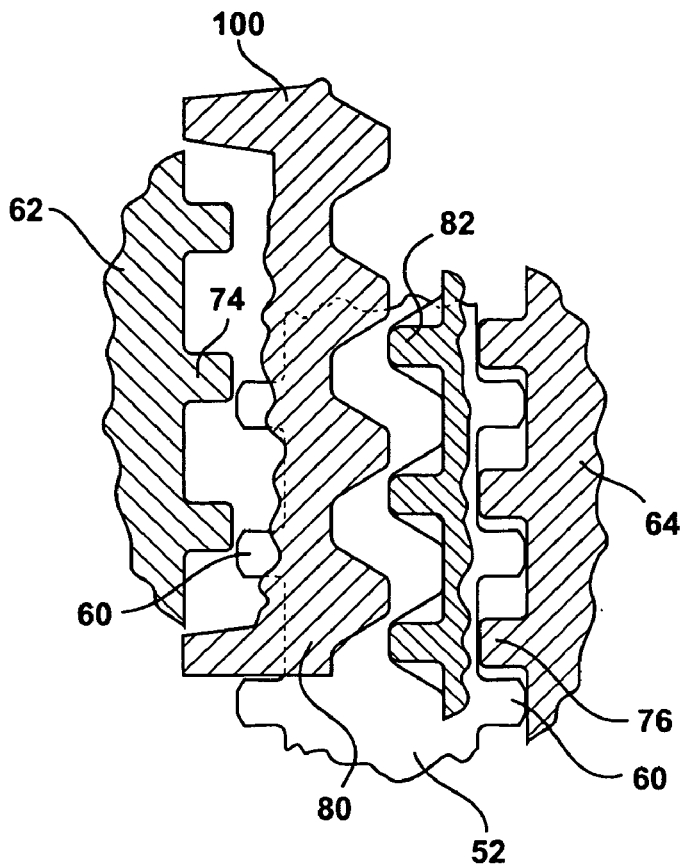

FIGS. 5-10 illustrate the different operational modes of the locking differential mechanism 12 of the present invention. More specifically, as illustrated in FIG. 5, when both axle half shafts 26, 28 and associated side gears 34, 36 are driven at the same speed, the central driver 52, clutch member 62, 64, cam assembly 78, and side gears 34, 36 all rotate together. As illustrated in FIG. 6, when the right wheel is over-running, the side gear 36 and axle half shaft 28 associated with the right wheel will rotate at a greater speed. Under these circumstances, the cam member 82 will move its associated clutch member 64 out of engagement with the central driver 52. In this way, the side gear 36 and its associated axle half shaft 28 will be able to rotate at a faster rotational speed than the side gear 34 associated with the left-hand tire. As best shown in FIG. 7, the locking differential mechanism 12 of the present invention operates in the same way when the left hand wheel is over-running, except that the cam member 80 and the associated clutch member 62 is moved out of engagement with the central driver 52 to allow the side gear 34 and associated axle half shafts 26 to rotate at a faster rotational speed.

Figure 8:
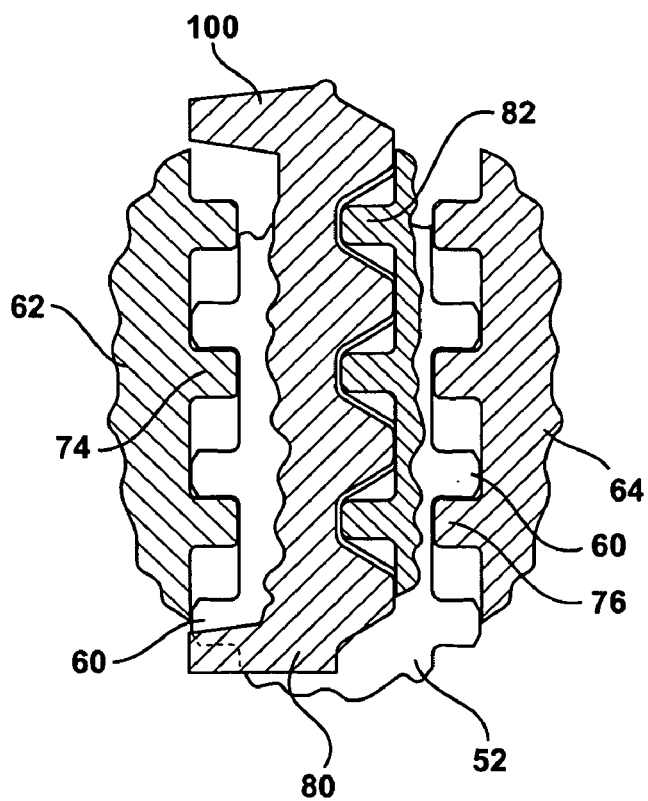

FIG. 8 illustrates the operational conditions when both wheels are drive at the same rotational velocity but in a coast condition. Under these circumstances, the central driver 52, clutch members 62, 64, cam assembly 78 and side gears 34, 36 all rotate together in a locked condition.

Figure 9:
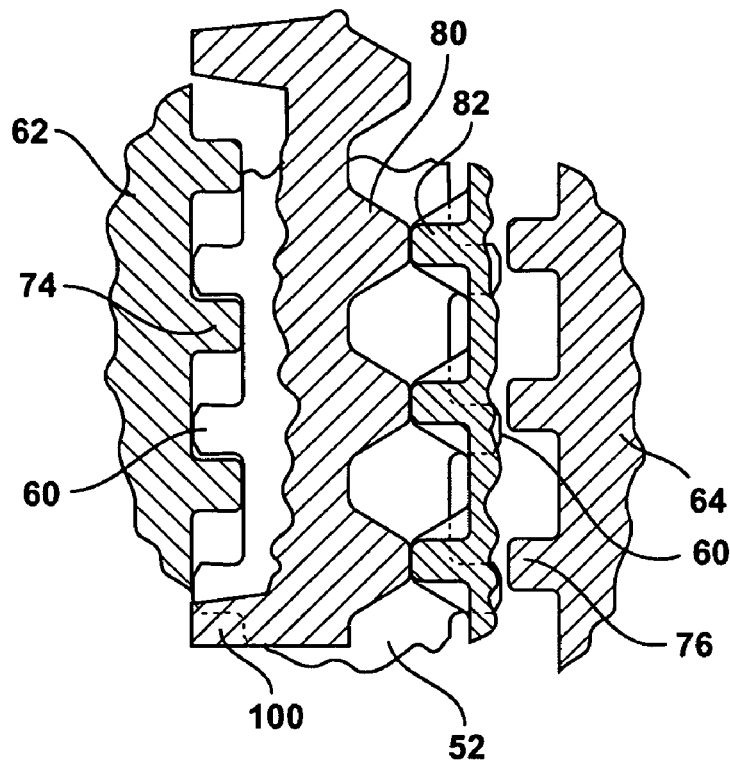
Figure 10:
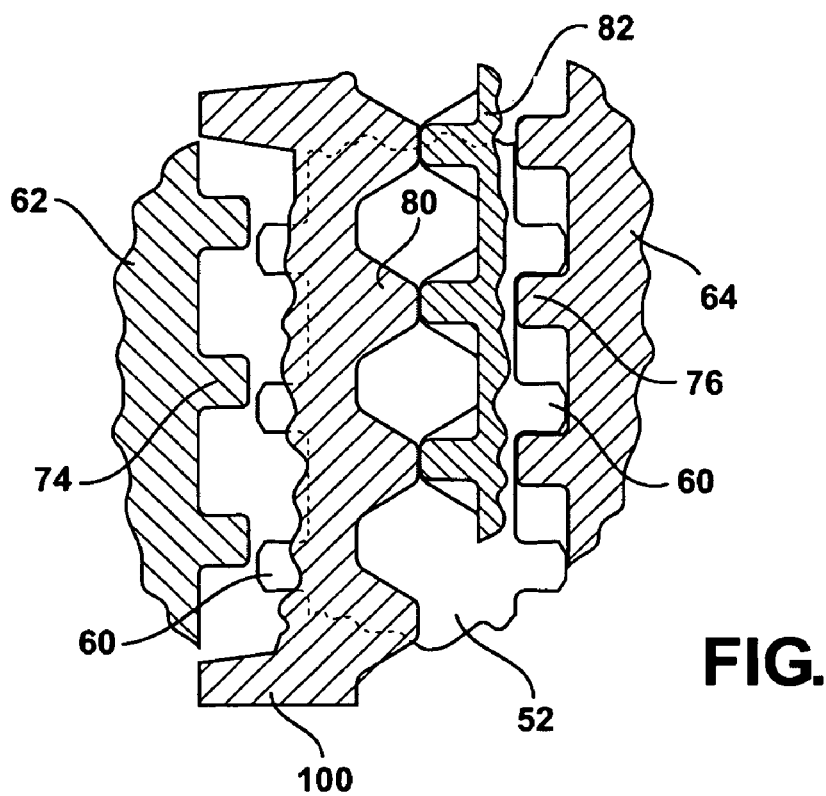

FIGS. 9 and 10 illustrate the operation of the locking differential mechanism 12 of the present invention when the axles 26, 28 are in contact and the right and left wheels are under-running, respectively. In each case, and as similarly described above, the cam member 80, 82 associated with the side gear 34, 36 rotating at a lower rotational velocity, moves the associated clutch member 62, 64 out of engagement with the central driver 52 to allow the side gear 34, 36 to rotate at a slower speed.

The locking differential mechanism 12 of the present invention achieves these results using only one hold out ring when compared to locking differentials known in the related art. In addition, the locking differential mechanism 12 of the present invention prevents the holdout ring 100 from "jumping the key" 110 and causing damage to the assembly. Moreover, the present invention is mechanically efficient and may be manufactured at a reduced cost. At the same time, because the camming teeth 88, 90 are designed for meshing and camming action relative to each other, the noise and vibration generated by the locking differential mechanism 12 of the present invention is reduced when there is a speed differential between the axle half shafts.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

I claim:

1. A locking differential mechanism for supplying torque from a driveshaft to a pair of aligned output shafts, said locking differential mechanism comprising:
    a pair of side gears mounted for rotation with the corresponding pair of aligned output shafts about a common axis;
    a central driver operatively coupled to the driveshaft and having a pair of opposed annular faces, each of said pair of opposed annular faces including a plurality of drive teeth;
    a pair of clutch members operatively coupled for rotation with a corresponding one of said pair of side gears, each of said pair of clutch members including a plurality of driven teeth, each of said pair of clutch members is axially movable between a first position where said driven teeth are adapted for meshing engagement in driven relationship with said drive teeth of said central driver so as to translate torque from said central driver through said clutch members and to said side gears and a second position wherein said driven teeth are moved out of meshing engagement with said drive teeth on said central driver such that the associated side gear may rotate at a speed different than said central driver;
    a cam assembly including a pair of opposed cam members, each of said cam members mounted for rotation with a corresponding one of said pair of side gears and disposed in abutting contact with the corresponding one of said pair of clutch members;
    each of said pair of opposed cam members including a plurality of camming teeth extending toward the corresponding teeth on the opposed cam member, each of said cam members movable from a first position wherein said camming teeth are disposed in meshing relationship with respect to each other when said pair of side gears are rotating at substantially the same speed, and a second position spaced axially from said first position along the associated side gear so as to move an associated clutch member from said first position to said second position thereby moving its associated clutch member out of driven relationship with said central driver in response to a variation in rotational speed of the associated one of said pair of side gears.

2. A locking differential mechanism as set forth in claim 1 wherein said camming teeth cause said cam member associated with the side gear rotating at a different speed to move axially relative to the other such that said camming teeth and said associated cam member is moved out of meshing relationship with the opposed cam member.

3. A locking differential mechanism as set forth in claim 1 further including a single holdout ring mounted for rotation with one of said pair of opposed cam members, said holdout ring indexable about the axis of rotation between a first position wherein said pair of side gears rotate at the same rotational speed and a second position wherein at least one cam member is disposed in said second axially spaced position and said holdout ring prevents re-engagement of said camming teeth when there is a rotational speed difference between said side gears.

4. A locking differential mechanism as set forth in claim 3 wherein said holdout ring includes a plurality of lugs disposed in annularly spaced positions about the outer circumference of said holdout ring, said lugs acting to prevent re-engagement of said cam members when said holdout ring has been indexed to its second position.

5. A locking differential mechanism as set forth in claim 3 wherein said locking differential mechanism defines a center line bisecting said differential mechanism, said holdout ring being mounted about one of said cam members and biased to one side of said center line.

6. A locking differential mechanism as set forth in claim 5 wherein said central driver defines an inner diameter having a key located biased to one side of said center line, said holdout ring including a slot that is adapted to engage said key when said holdout ring has been indexed to its second position so as to block re-engagement of the camming teeth on the pair of cam members.

7. A locking differential mechanism as set forth in claim 6 further including a pair of annular retainers operatively mounted to a corresponding one of said pair of side gears, a pair of biasing members disposed between each one of said pair of retainers and each one of said pair of clutch members, said pair of biasing member acting to bias said pair of clutch members toward said first position.

8. A locking differential mechanism as set forth in claim 7 wherein said key has a predetermined axial width, said holdout ring supported for axial movement with one of said pair of cam members, said second position of said pair of clutch members being limited by said pair of annular retainers such that the distance of travel of said pair of clutch members to said second position is less than the axial width of said key such that said holdout ring is prevented from being moved axially out of engagement with said key when said holdout ring is indexed to said second position.

9. A locking differential mechanism as set forth in claim 1 wherein each of said pair of clutch members defines a smooth annular surface disposed radially inward of said plurality of driven teeth and in the direction of the associated cam member, each of an associated one of said cam members including a corresponding outwardly directed smooth annular face disposed in abutting contact with said annular surface on said corresponding one of said cam members.

10. A locking differential mechanism as set forth in claim 1 wherein the camming teeth of one of said pair of cam members extends for a longer radial length than the camming teeth on the opposed clutch member.

11. A locking differential mechanism as set forth in claim 1 wherein each of said side gears includes an inner terminal end, and wherein said locking differential mechanism further includes a spacer disposed between the opposed pair of terminal ends of each of said pair of side gears.

12. A locking differential mechanism as set forth in claim 1 further including a housing, said locking differential mechanism operatively supported within said housing, said housing including an inner surface having a plurality of splines, said central driver including an outer surface having a corresponding plurality of splines that cooperate with said splines on the inner surface of said housing to fix said central driver for rotation with said housing.

13. A locking differential for supplying torque from a driveshaft to a pair of aligned output shafts, said locking differential comprising:
   a housing and a locking differential mechanism operatively supported within said housing, said housing including an inner surface having a plurality of splines;
   said differential mechanism including a pair of side gears supported for rotation within said housing with the corresponding pair of aligned output shafts about a common axis;
   a central driver including an outer surface having a corresponding plurality of splines that cooperate with said splines on said inner surface of said housing to fix said central driver for rotation with said housing, said central driver having a pair of opposed annular faces, each of said pair of opposed annular faces including a plurality of drive teeth;
   a pair of clutch members operatively coupled for rotation with a corresponding one of said pair of side gears, each of said pair of clutch members including a plurality of driven teeth, each of said pair of clutch members axially movable between a first position where said driven teeth are adapted for meshing engagement in driven relationship with said drive teeth of said central driver so as to translate torque from said central driver through said clutch members and to said side gears and a second position wherein said driven teeth are moved out of meshing engagement with said drive teeth on said central driver such that the associated side gear may rotate at a speed different than said central driver;
   a cam assembly including a pair of opposed cam members, each of said cam members mounted for rotation with a corresponding one of said pair of side gears and disposed in abutting contact with the corresponding one of said pair of clutch members;
   each of said pair of opposed cam members including a plurality of camming teeth extending toward the corresponding teeth on the opposed cam member, each of said cam members movable from a first position wherein said camming teeth are disposed in meshing relationship with respect to each other when said pair of side gears are rotating at substantially the same speed, and a second position spaced axially from said first position along the associated side gear so as to move an associated clutch member from said first position to said second position thereby moving its associated clutch member out of driven relationship with said central driver in response to a variation in rotational speed of the associated one of said pair of side gears.

14. A locking differential mechanism as set forth in claim 13 wherein said camming teeth cause said cam member associated with the side gear rotating at a different speed to move axially relative to the other such that said camming teeth and said associated cam member is moved out of meshing relationship with the opposed cam member.

15. A locking differential mechanism as set forth in claim 13 further including a single holdout ring mounted for rotation with one of said pair of opposed cam members, said holdout ring indexable about the axis of rotation between a first position wherein said pair of side gears rotate at the same rotational speed and a second position wherein at least one cam member is disposed in said second axially spaced position and said holdout ring prevents re-engagement of said camming teeth when there is a rotational speed difference between said side gears.

16. A locking differential mechanism as set forth in claim 15 wherein said holdout ring includes a plurality of lugs disposed in annularly spaced positions about the outer circumference of said holdout ring, said lugs acting to prevent re-engagement of said cam members when said holdout ring has been indexed to its second position.

17. A locking differential mechanism as set forth in claim 15 wherein said locking differential mechanism defines a center line bisecting said differential mechanism, said holdout ring being mounted about one of said cam members and biased to one side of said center line.

18. A locking differential mechanism as set forth in claim 17 wherein said central driver defines an inner diameter having a key located biased to one side of said center line, said holdout ring including a slot that is adapted to engage said key when said holdout ring has been indexed to its second position so as to block re-engagement of the camming teeth on the pair of cam members.

19. A locking differential mechanism as set forth in claim 18 further including a pair of annular retainers operatively mounted to a corresponding one of said pair of side gears, a pair of biasing members disposed between each one of said pair of retainers and one of said pair of clutch members, said pair of biasing member acting to bias said pair of clutch members toward said first position of said pair of clutch members.

20. A locking differential mechanism as set forth in claim 19 wherein said key has a predetermined axial width, said holdout ring supported for axial movement with one of said pair of cam members, said second position of said pair of clutch members being limited by said pair of annular retainers such that the distance of travel of said pair of clutch members to said second position is less than the axial width of said key such that said holdout ring is prevented from being moved axially out of engagement with said key when said holdout ring is indexed to said second position.

* * * * *